(No Model.)
J. M. ANDERSEN.
TROLLEY SUPPORT FOR ELECTRIC RAILWAYS.
No. 506,617. Patented Oct. 10, 1893.
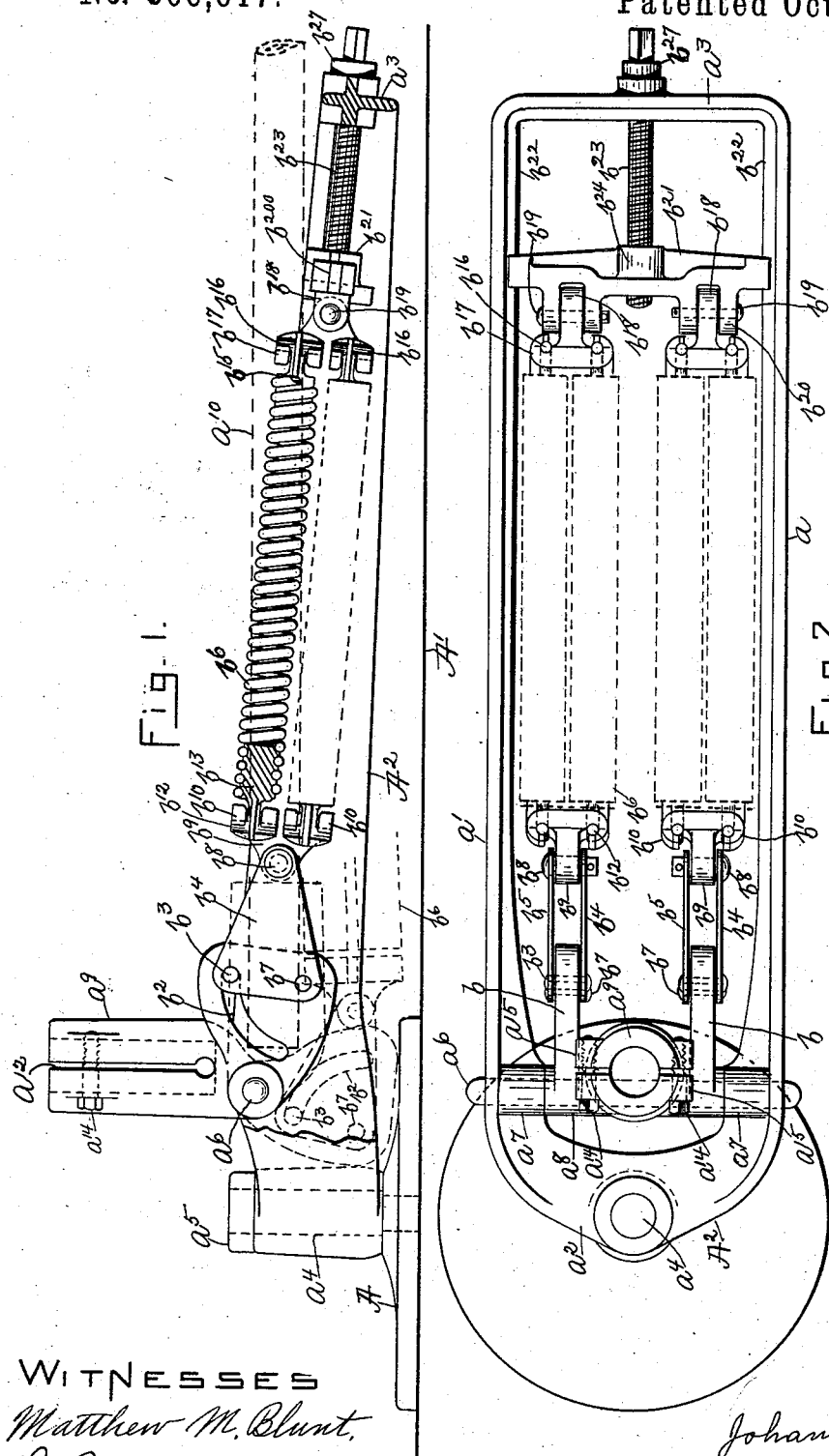
WITNESSES
Matthew M. Blunt.
J. Murphy.
INVENTOR
Johan M. Andersen
By Jas. H. Churchill
ATTY

UNITED STATES PATENT OFFICE.

JOHAN M. ANDERSEN, OF BOSTON, MASSACHUSETTS, ASSIGNOR OF ONE-HALF TO ALBERT ANDERSON, OF SAME PLACE.

TROLLEY-SUPPORT FOR ELECTRIC RAILWAYS.

SPECIFICATION forming part of Letters Patent No. 506,617, dated October 10, 1893.

Application filed April 14, 1893. Serial No. 470,303. (No model.)

*To all whom it may concern:*

Be it known that I, JOHAN M. ANDERSEN, residing in Boston, in the county of Suffolk and State of Massachusetts, have invented an Improvement in Trolley-Supports, of which the following description, in connection with the accompanying drawings, is a specification, like letters on the drawings representing like parts.

This invention relates to a novel construction of support or holding mechanism for the trolley pole used in the overhead system of electric railways.

My present invention has for its object to provide a simple and efficient mechanism, which, when mounted upon a car, projects but a substantially short distance above the roof of the car, and which is so constructed as to enable the trolley pole to be brought near to and substantially parallel with the roof of the car, whereby, my improved trolley pole-holder may be used on electric railways in which the trolley wire is suspended but a substantially short distance above the roof of the car, and whereby a car, thus equipped, may pass under low bridges or other similar structures situated but a substantially short distance above the road-bed. In accordance with my present invention, the trolley pole-holder is mounted to rock in a vertical direction upon a shaft or rod having bearings in a frame pivotally mounted upon a suitable base or casting, to enable the trolley pole to be turned toward either end of the car, the pivot of the said supporting frame being located out of line with the trolley pole-holder and preferably in front of the said shaft, as will be described. The trolley pole-holder is normally turned into a substantially upright position by means of springs having one end secured to a frame sliding on suitable ribs or guides secured to or forming part of the pivotal frame referred to, the other ends of the said springs being secured to the trolley pole-holder, as will be described. These and other features of my invention will be pointed out in the claims at the end of this specification.

Figure 1, represents in side elevation partially broken out a trolley pole-holding mechanism embodying my invention, the trolley pole being indicated by dotted lines in its lowered position substantially parallel with the roof of the car, and Fig. 2, a top or plan view of the trolley pole-holding mechanism shown in Fig. 1.

Referring to Fig. 1, A represents a suitable base or casting, herein shown as circular in form, which is adapted to be secured in any suitable manner to the roof of the car, represented by the heavy black line $A'$. The casting A has pivotally mounted upon it a supporting frame $A^2$, consisting, as herein shown, of side pieces $a\ a'$ and end pieces $a^2\ a^3$, the end $a^2$ being provided with a suitable hole or opening through which is extended the pin $a^4$ constituting the pivot pin for the frame $A^2$, the said pin, as herein represented, being provided with a cap or head $a^5$. The supporting frame $A^2$, in accordance with my present invention, forms bearings for a shaft or rod $a^6$, the said bearings being located behind the pivotal point of the said frame and preferably being formed by enlargements or hubs $a^7$ forming part of the side pieces $a\ a'$. The shaft $a^6$ between the side pieces $a\ a'$ has mounted upon it, as herein shown, a sleeve $a^8$ having secured to or forming part of it an upright tubular portion $a^9$ constituting a socket or holder into which is inserted the lower end of the trolley pole $a^{10}$, shown only by dotted lines in Fig. 1, the tubular socket or portion $a^9$ being herein represented as divided by a longitudinal slot $a^{12}$ into two parts or halves, which are adapted to be drawn together to grip the trolley pole by the clamping screws $a^{14}$ extended through suitable side lugs $a^{15}$ on the halves of the socket $a^9$. The sleeve $a^8$ has extended from it on opposite sides of the socket or tubular portion $a^9$, arms $b\ b$ preferably made susbtantially triangular in shape as herein shown. Each arm $b$ is provided, as shown, with a curved slot $b^2$ through which is extended a pin or rivet $b^3$, connecting two side plates $b^4\ b^5$ constituting a link to connect the trolley pole-holder with its operating springs $b^6$. The side plates $b^4\ b^5$ of the link are preferably made substantially triangular in shape as herein shown, and are pivotally connected to the arms $b$ by a pivot pin or rivet $b^7$, the said plates being also secured at their apices as by a pin $b^8$ to a plate or casting $b^9$ provided on its opposite sides, as herein represented, with two slotted arms $b^{10}$, each of which is adapted to receive and engage a cross bar $b^{12}$ on a screw or threaded rod $b^{13}$ inserted into the end of the coiled spring $b^6$, connected at its opposite end by a similar threaded rod $b^{15}$ and cross bar $b^{16}$, to slotted arms $b^{17}$ on a casting or plate $b^{18}$, pivotally connected by a pin $b^{19}$ to lugs or ears $b^{20}$ on a cross bar $b^{21}$, provided at its opposite ends with guide ways $b^{200}$ to embrace guiding ribs $b^{22}$ on the sides $a\ a'$ of the frame $A^2$. The cross bar $b^{21}$ is movable on the ribs $b^{22}$ by means of a threaded bolt or rod $b^{23}$, extended through a threaded socket or hub $b^{24}$ in the sliding cross bar $b^{21}$, and through the end $a^3$ of the frame $A^2$, the said rod being provided outside the frame $A^2$ with a collar $b^{27}$.

In my improved trolley pole-supporting mechanism, the trolley pole-holder $a^9$ is normally brought into the position indicated by full lines, Fig. 1, by the springs $b^6$, when free, but when it is in practical operation on a car, the trolley pole is inclined backward, and the trolley wheel is held up against the trolley wire by the springs $b^6$, and when the car passes under a substantially low bridge or like structure, the trolley pole is automatically brought into substantially the position indicated by dotted lines, Fig. 1, the springs $b^6$ being elongated by the movement of the arms $b$ from their full line positions to their dotted line positions, Fig. 1, and in the said movement, the pin or rivet $b^3$ travels in the curved slot $b^2$, the curve of which forms part of a circle having the pin $b^7$ as a center. The supporting frame $A^2$ is shaped or constructed so that its side pieces incline or taper downwardly away from the pivot of the trolley pole holder where the rear end $a^3$ of the said frame is brought substantially near the roof of the car, and the trolley pole-holder is mounted at the front end of the supporting frame at the upper portion thereof, so that, in the normal or vertical position of the trolley pole-holder, as represented by full lines in Fig. 1, the springs $b^6$ will be inclined rearwardly from the pivot $a^4$ of the supporting frame toward the top of the car. By this construction, the trolley pole-holder may be brought from its substantially vertical position into a position substantially at right angles thereto, as represented in Fig. 1 by dotted lines, and the trolley pole $a^{10}$ may be brought below a line or plane substantially parallel with the top of the car, and by inclining the rear portion of the supporting frame so that its rear cross bar or end $a^3$ is below a horizontal line through the shaft $a^6$ as represented in Fig. 1, the pole $a^{10}$ may be brought close to the roof of the car, so that, the trolley wheel may roll against the trolley wire, which may be located but a little distance above the trolley supporting mechanism. Furthermore, by constructing a supporting frame, so that the trolley pole-holder is pivoted in the said frame out of vertical line with the pivot for the frame, the trolley pole support or holding mechanism may be made compact and of little height, so that, it projects but a substantially short distance above the top of the car, thereby enabling the overhead trolley wire system to be used on highways provided with low bridges or similar structures spanning the highway, whereas, heretofore the overhead electric trolley wire system could not be extended or used on highways having low bridges without change to the bridges or other structures, on account of the height of the trolley pole-holding mechanism above the car, and also on account of the rear end of the trolley pole, when the latter had been brought into its lowest position nearest the car, being at such time a considerable distance above the car. So also, by making the trolley pole-holding mechanism compact and so as to lie close to the top of the car, the electric car is given a neater and less objectionable appearance.

By means of the pivotal frame $A^2$, the trolley pole and its mechanism may be swung on the pivot $A^4$, when it is desired to change the direction of the travel of the car.

I claim—

1. In a trolley pole supporting mechanism, the combination with a base, of a supporting frame pivoted thereto at or near one end and consisting of side and end pieces, a trolley pole holder secured to the side pieces to rock in a substantially vertical direction, springs connected to the trolley pole holder, a cross bar movable on the side pieces of the frame and to which the springs are connected, and means to move said cross bar, substantially as described.

2. In a trolley pole supporting mechanism, the combination with a base, of a supporting frame pivoted to the said base at one end and provided with side pieces tapering or downwardly inclined toward their rear ends, a trolley pole holder secured to said side pieces to rock in a substantially vertical direction, and springs carried by the said frame and connected to the trolley pole holder, substantially as described.

3. In a trolley pole supporting mechanism, the combination of the following instrumentalities; viz:—a base, a supporting frame pivoted thereto at or near one end, and provided with side guiding ribs, a trolley pole-holder secured to the said frame out of line with its pivot to rock thereon in a substantially vertical plane, springs connected to the trolley pole-holder and to a cross bar movable on the said side guiding ribs, and an adjusting rod extended through the said cross bar and supporting frame, substantially as described.

4. In a trolley pole-supporting mechanism, the combination of the following instrumentalities; viz:—a base, a supporting frame pivoted thereto, a trolley pole-holder mounted in said frame to rock in a substantially vertical direction, an arm $b$ attached to the trolley pole-holder and provided with a curved slot $b^2$, a link pivotally secured to a solid portion of said arm and provided with a pin extended into the slot $b^2$, and springs connected to said link, substantially as described.

In testimony whereof I have signed my name to this specification in the presence of two subscribing witnesses.

JOHAN M. ANDERSEN.

Witnesses:
JAS. H. CHURCHILL,
J. MURPHY.